United States Patent

Vance et al.

Patent Number: 6,094,574
Date of Patent: Jul. 25, 2000

[54] ALPHA ENHANCED PAGING AND VOICE MAIL SYSTEM AND METHOD

[76] Inventors: Kenneth Ronald Vance, 3627 N. Echo Trail, Plano, Tex. 75023; Edward Ernest Jungerman, Jr., 2402 Lawnmeadow, Richardson, Tex. 75080

[21] Appl. No.: 08/962,270

[22] Filed: Oct. 31, 1997

[51] Int. Cl.$^7$ ................................................. H04Q 7/38
[52] U.S. Cl. ......................... 455/415; 455/458; 455/563; 379/127; 379/142
[58] Field of Search ..................................... 379/142, 127, 379/183, 118, 245, 247; 455/415, 410, 411, 563, 414, 458, 467, 31.2

[56] References Cited

U.S. PATENT DOCUMENTS

| Re. 33,417 | 10/1990 | Bhagat et al. ............................ 455/460 |
| 4,723,273 | 2/1988 | Diesel et al. ............................ 379/211 |
| 4,821,308 | 4/1989 | Hashimoto ................................ 379/57 |
| 4,942,598 | 7/1990 | Davis ....................................... 379/57 |
| 4,994,797 | 2/1991 | Breeden ............................ 340/825.44 |
| 5,007,076 | 4/1991 | Blakley ................................. 379/88.21 |
| 5,144,648 | 9/1992 | Bhagat et al. ............................ 379/57 |

(List continued on next page.)

OTHER PUBLICATIONS

"ZapPhone CID Page", Brochure faxed Sep. 10, 1996, Sunrise Services, Inc., 1 pg.
"Sunrise Unveils Paging's Caller ID", Article faxed Sep. 10, 1996, 1 pg.
"AT&T goes nationwide with PCS", The Dallas Morning News, Technology Report, Oct. 3, 1996, 1 pg.
"Introducing AT&T Digital PCS", Flyer faxed Sep. 10, 1996, 1 pg.
"Cellular Update", AT&T Wireless Services, AT&T World Wide Web Site, Oct. 7, 1996, 2 pgs.
"Frequently Asked Questions", AT&T Wireless Services, AT&T World Wide Web Site, Oct. 7, 1996, 6 pgs.
"PageNet to Beep Free CNN Service Directly to Users", by Gautam Naik, DALMICHA, Nov. 1, 1996, 1 pg.
"Paging Industry Faces New Competition From PCS Systems", by Rebecca Buckman, DALMICHA, Nov. 1, 1996, 3 pgs.
"Constant-Touch™Call Manager" Brochure, Glenayre, Sep. 10, 1996, 2 pg.
"MVP™ Modular Voice Processing Family Standalone Application Features", Leaflet, Glenayre, 2 pg.

*Primary Examiner*—Dwayne D. Bost
*Assistant Examiner*—Sonny Trinh
*Attorney, Agent, or Firm*—Jenkens & Gilchrist, PC

[57] ABSTRACT

A wireless communications system, such as a paging system, that provides caller identification to a mobile unit. The paging system includes an IVR unit for prompting a caller to enter a call back number and a caller base number. The call base number is a number associated with the identity of the caller, such as the caller's home number or main business number. The paging system further includes an interface unit for obtaining caller identification information from a telephone listing database in an external database, such as the line identification database (LIDB) in a public switched telephone network. In operation, the paging system first determines caller identification from the base number by accessing the LIDB database for a listing corresponding to the base number. The paging system may also perform other steps to determine the caller identification from the caller's base number, such as searching a reverse look-up telephone directory. If the call base number is unavailable or fails to produce caller identification information, the paging system may use the call back number to determine caller identification information. The paging system may also include a voice recognition unit to obtain caller identification information. A voice mail system may also be connected to the paging system that stores a voice mail message from the caller and assigns queue information to the voice mail message. The paging system then transmits a message to the pager that includes the call back number, caller identification, and queue information. A cellular telephony system or personal communications services (PCS) system may also implement the paging system by transmitting the call back number, caller identification and queue information to a mobile station using short messaging services.

8 Claims, 9 Drawing Sheets

U.S. PATENT DOCUMENTS

| | | | |
|---|---|---|---|
| 5,206,900 | 4/1993 | Callele | 379/142 |
| 5,228,080 | 7/1993 | Nutter et al. | 379/373 |
| 5,276,731 | 1/1994 | Arbel et al. | 379/88 |
| 5,283,824 | 2/1994 | Shaw | 379/142 |
| 5,289,528 | 2/1994 | Ueno et al. | 379/67 |
| 5,315,636 | 5/1994 | Patel | 379/58 |
| 5,329,578 | 7/1994 | Brennan et al. | 379/67 |
| 5,329,583 | 7/1994 | Jurgensen et al. | 379/266 |
| 5,357,245 | 10/1994 | Hagiwara | 340/825.34 |
| 5,371,781 | 12/1994 | Ardon | 455/445 |
| 5,384,831 | 1/1995 | Creswell et al. | 379/67 |
| 5,402,466 | 3/1995 | Delahanty | 379/44 |
| 5,418,835 | 5/1995 | Frohman et al. | 379/57 |
| 5,490,205 | 2/1996 | Kondo et al. | 379/67 |
| 5,502,761 | 3/1996 | Duncan et al. | 379/142 |
| 5,511,111 | 4/1996 | Serbetcioglu et al. | 379/67 |
| 5,544,229 | 8/1996 | Creswell et al. | 379/67 |
| 5,559,860 | 9/1996 | Mizikovsky | 379/58 |
| 5,559,862 | 9/1996 | Bhagat et al. | 455/460 |
| 5,561,703 | 10/1996 | Arledge et al. | 379/57 |
| 5,579,375 | 11/1996 | Ginter | 379/59 |
| 5,592,532 | 1/1997 | Koizumi | 379/58 |
| 5,600,703 | 2/1997 | Dang et al. | 379/57 |
| 5,604,492 | 2/1997 | Abdul-Halim | 340/825.44 |
| 5,668,852 | 9/1997 | Holmes | 405/31.1 |
| 5,784,444 | 7/1998 | Snyder et al. | 379/142 |
| 5,822,727 | 10/1998 | Garberg et al. | 704/243 |
| 5,835,126 | 11/1998 | Lewis | 348/8 |
| 5,857,016 | 1/1999 | Jedliccka | 379/142 |
| 5,903,636 | 5/1999 | Malik | 379/142 |

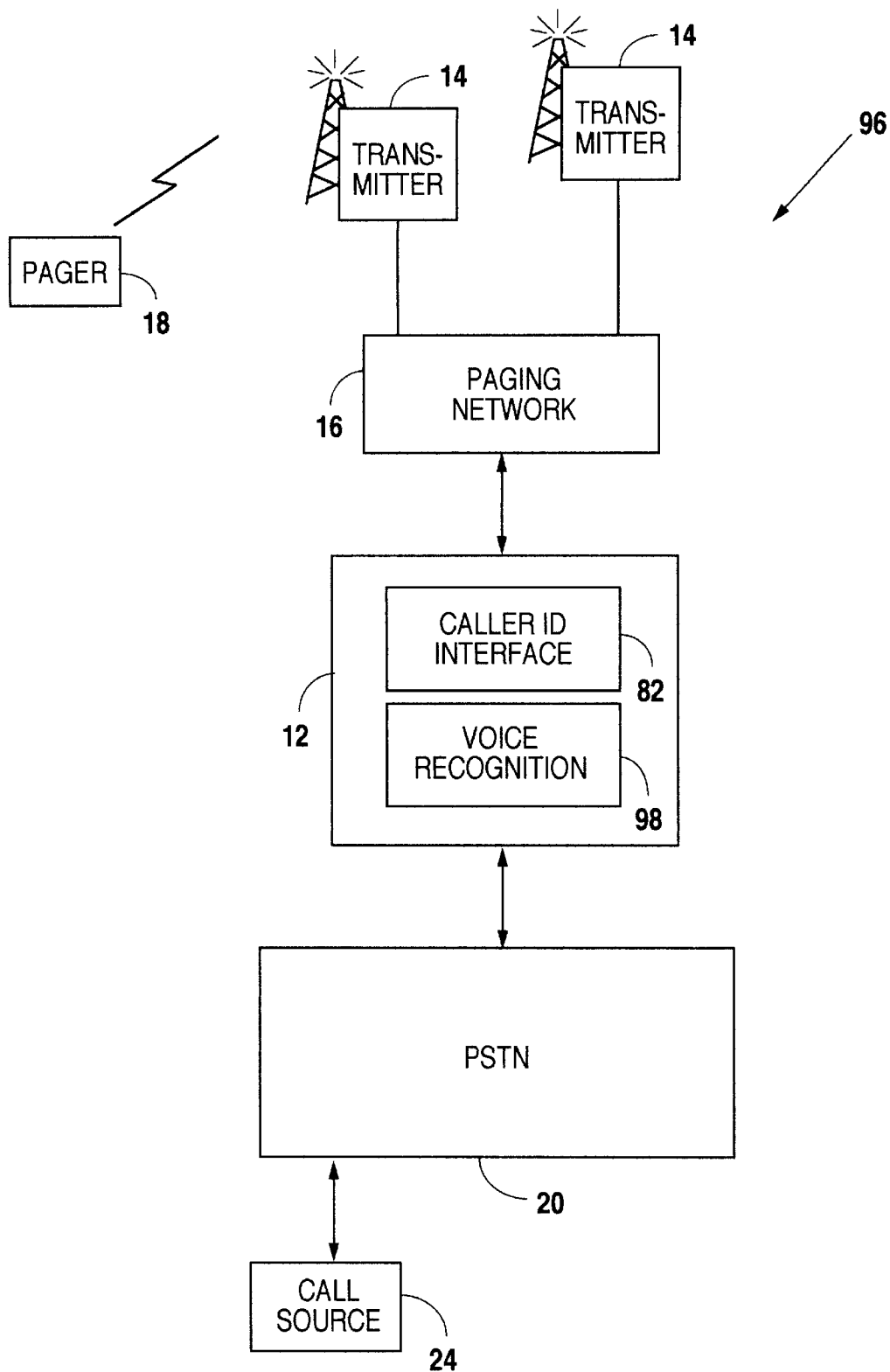

6,094,574

ALPHA ENHANCED PAGING AND VOICE MAIL SYSTEM AND METHOD

TECHNICAL FIELD OF THE INVENTION

This invention relates to paging and voice mail services, and more particularly, to a paging and voice mail system that provides caller identification information.

BACKGROUND OF THE INVENTION

Most conventional paging systems only provide numeric paging wherein the paging unit displays a call back number to the subscriber. Unless the subscriber recognizes the call back number, there is no method for determining the identity of the caller or other alphanumeric information.

One prior art solution is a paging system that identifies the caller from a table of predetermined caller identifications. A caller enters a call back number and message. The system compares the call back number with call back numbers stored in a subscriber unique list. For each subscriber, a set of page source numbers are pre-programmed into a data base memory to comprise the subscriber unique list. If there is a match, the paging system generates a source tag of 2 ASCII characters corresponding to that call back number. The paging system encodes the source tag along with the message and call back number and transmits the encoded information to the paging unit. The paging unit searches a pre-programmed database within its own memory and selects a predetermined caller identification corresponding to the received source tag. The paging unit then displays the caller identification and caller generated message.

This method of identifying a caller in the paging system has several drawbacks. For example, the subscriber unique list must be pre-programmed with the call back number and associated caller identification. Otherwise, the paging system is unable to identify the caller. In addition, if the caller is calling from a pay phone or otherwise enters an unfamiliar call back number, the paging system will again be unable to identify the caller.

Other prior art solutions use a PC-based software to input an alphanumeric message to the pager. However, it is relatively difficult and time-consuming to configure a PC with paging software to originate an alphanumeric page, and when a caller wishes to page a subscriber, a properly configured PC is rarely in the vicinity.

Another prior art solution is for a service bureau to input an alphanumeric message to the subscriber. This method, however, is costly and may be unavailable at different hours depending on the service bureau.

Thus, there is a need in the industry for a simple and cost-effective means for a large audience of potential callers to be able to originate a page, from any location, and for the paging system to provide caller identification and other alphanumeric information on a pager.

SUMMARY OF THE INVENTION

The present invention is directed to a paging system that includes an IVR unit for prompting a caller to enter a call back number and a caller base number. The call base number is a number associated with the identity of the caller, such as the caller's home number or main business number. The paging system further includes an interface unit for obtaining caller identification information from a telephone listing database in an external database; and a message assembly unit for assembling a message to a mobile unit, wherein the message includes the call back number of the caller and the caller identification information. In operation, the paging system first determines caller identification from the base number by accessing the external database of telephone listings. For example, the paging system may access the line identification database (LIDB) of the public switched telephone network. The paging system may also perform other steps to determine the caller identification from the caller's base number. For example, the paging system may include an exception list and reverse directory. The reverse directory is a telephone listing of telephone numbers and corresponding listings while the exception list is database of numbers and corresponding listings programmable in response to a mobile subscriber's request. The paging system may then search the exception list for a corresponding listing to the base number and in response to not locating a corresponding listing to the base number in the exception list, search the reverse directory for a corresponding listing to the base number. If the call base number is unavailable or fails to produce caller identification information, the paging system may use the call back number to determine caller identification information. The paging system may also include a voice recognition unit to obtain caller identification information.

BRIEF DESCRIPTION OF THE DRAWINGS

For a more complete understanding of the present invention and for further objects and advantages thereof, reference may now be had to the following description taken in conjunction with the accompanying drawings in which like numerals are used for similar parts:

FIG. 8 illustrates a third embodiment of the paging system of the present invention;

DETAILED DESCRIPTION OF THE INVENTION

Alpha Enhanced Numeric Paging

Figure 1:
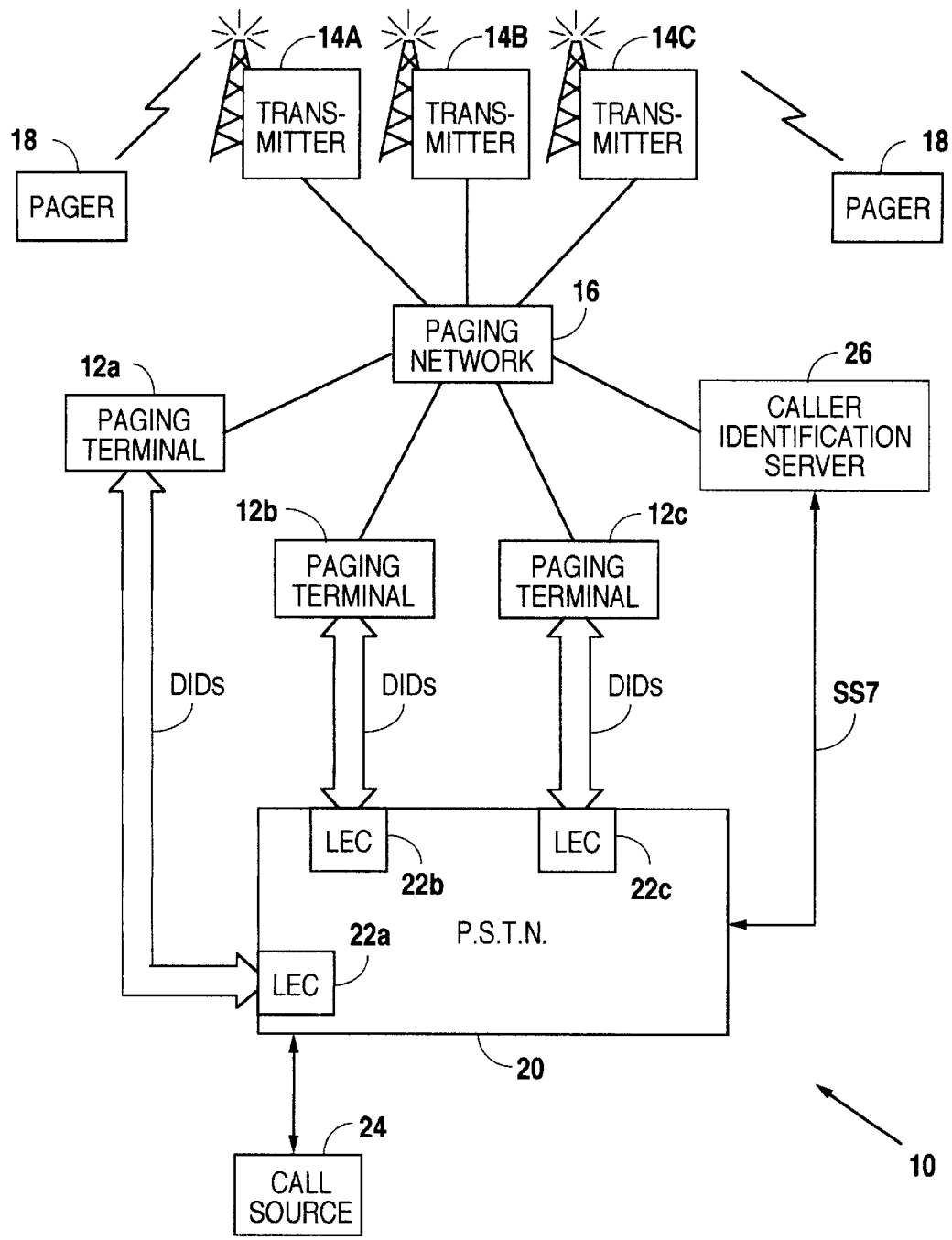
FIG. 1 illustrates a paging system in which the present invention may be implemented.

FIG. 1 illustrates an alpha enhanced numeric paging system 10 in which a first embodiment of the present invention may be implemented. The paging system 10 includes one or more paging terminals 12a, 12b, and 12c. The paging terminals 12 receive and process requests for pages from different geographical locations or shared call flow within the same geographical location. The paging terminals 12 communicate paging messages to the transmitters 14a, 14b and 14c through paging network 16. The paging network 16 is preferably, but not necessarily, a Telecator Network Paging Protocol (TNPP) compliant network and/or Wireless Messaging transfer protocol (WMtp) compliant network. TNPP is a paging industry standard protocol designed for communications between paging switches and other paging network elements supporting one-way paging while WMtp is an enhanced protocol that supports both one-way and two-way paging. The transmitters 14 transmit the paging messages to pagers 18 and receive acknowledge signals, if any, from the pagers 18.

The pagers 18 comprise typical components such as an antenna, transceiver, frequency synthesizer, power switch, display, decoder/microcontroller, audible alert, tactile alert, and selector controls. At a minimum, the pagers 18 must receive, decode and display alpha numeric paging messages as described herein. The display of the pagers 18 is explained in more detail below with reference to FIG. 7.

The paging terminals 12 are also connected to the public switched telephone network (PSTN) 20 through respective local exchange carriers (LEC) 22a, 22b or 22c depending on the geographical location in which the paging terminal 12 is located. Typically, the paging terminals 12 are connected to the LECs 22 through direct inward dial (DID) lines or trunks. On the DID lines or trunks, the PSTN 20 signals the final digits of a number dialed to the paging terminal 12. These final digits are used by the paging terminal 12 to identify the subscriber being called. As a result, the DID lines identify a subscriber to the paging terminal 12 without needing an extension or personal identification number (PIN).

Each LEC 22within PSTN 20 includes a line identification database (LIDB) that comprises a listing of all the telephone numbers and corresponding directory listings for that LEC 22. The PSTN 20 switches and connects various call sources 24, such as telephones, mobile phones, PBX's, etc. to the paging terminals 12.

The paging system 10 also includes a caller identification server (CIS) 26 which provides caller identification information to the paging system 10. The CIS 26 is connected to the PSTN 20 through a signaling system 7 (SS7) network, or an X.25 packet-switched data network connection to a third-party SS7/LIDB access provider, which allows the CIS 26 to access the LIDB databases within LECs 22.

Figure 2:
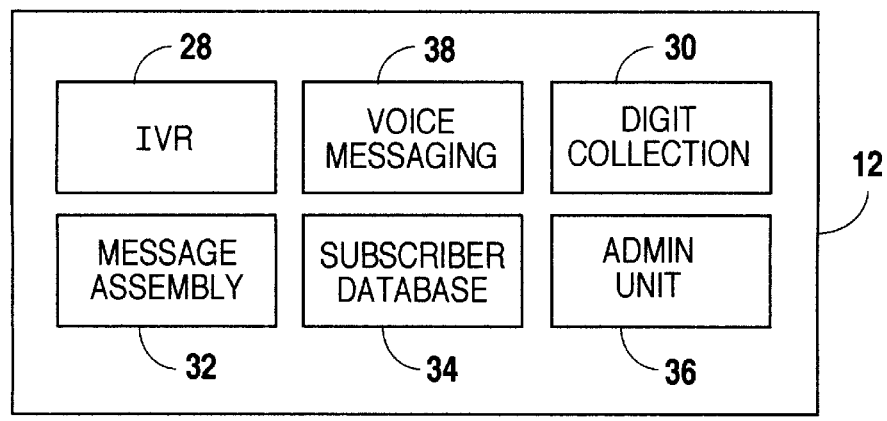
FIG. 2 illustrates a paging terminal in the paging system of the present invention.

FIG. 2 illustrates the paging terminal 12 in more detail. The paging terminal 12 includes an interactive voice response unit (IVR) 28, a digit collection unit 30, a paging message assembly unit 32, a subscriber database 34, and an administrative unit 36. The paging terminal 12 may also include a voice messaging unit 38 for the provision of voice mail services in the paging system 10, as described in more detail with respect to FIG. 9. The paging terminal 12 typically comprises a paging switch such as the line of products provided by Glenayre Electronics in Charlotte, N.C. In addition, the paging terminal 12 comprises additional software applications and/or hardware which implements required functionality described herein.

Figure 3:
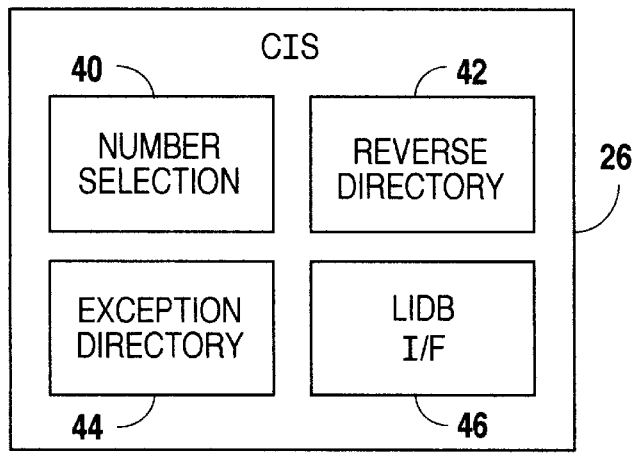
FIG. 3 illustrates a caller identification server in which the present invention may be implemented.

The CIS 26 of FIG. 1 is shown in more detail in FIG. 3. The CIS 26 includes a number selection unit 40, a reverse directory 42, an exception directory 44, and LIDB interface 46. The LIDB interface 46 in the CIS 26 accesses a LIDB database in the LEC 22 over the SS7 network shown in FIG. 1. In particular, the CIS 26 accesses calling name delivery (CNAM) files in the LIDB database that includes caller identification information for telephone listings. By centralizing or regionalizing the CIS 26, the paging terminals 12 may share the SS7 access to the LIDB database. The LIDB interface 46 provides SS7-compliant connectivity to the SS7 network and TCAP-compliant software to implement a LIDB access (typically called a CNAM request) by the CIS 26. For example, the LIDB interface 46 may include a protocol converter that converts an X.25 formatted message from the paging terminal 12 to an SS7 query, such as a TCAP invoke message or ISDN-UP message. Alternatively, the LIDB interface 46 may interface with a third party SS7/LIDB access provider. The LIDB interface 46 sends an X.25 formatted message to the third party access provider who converts the message to an SS7 query. The third party provider then converts an SS7 reply message from the LIDB database for an X.25 formatted message and transmits the reply message to the LIDB interface 46. The LIDB interface 46 may also be implemented as a separate gateway computer attached to the CIS server 26.

The operation of the paging system 10 is now explained with reference to FIG. 4. Depicted in step 48, the paging system 10 receives an incoming call from a call source 24 at one of the paging terminals 12. Since the paging terminal 12 desires to process all incoming calls irrespective of the call source 24, the paging terminal 12 automatically answers and processes the incoming call. In step 50, the IVR unit 28 prompts the caller to enter a call back number either by an audible tone or beep or by a voice prompt. The caller may either input the call back number or bypass the option. The paging terminal 12 then prompts the caller for a home phone number or a main business number (the caller's base number), in step 54 of the process. Again, the caller may input this additional information or bypass the option. The caller's base number is any telephone number that is associated with the caller's identity, such as the caller's main business number, home number, or other number listed in the caller's name. In some instances, the call back number and the caller's base number will be the same number, e.g. when the caller is calling from home. Thus, if the two numbers are the same, the caller may wish to bypass the option to input a base number. The present invention will still identify the caller because, as described below, the present invention uses the call back number to identify the caller when the base number is unavailable.

Table 1 below illustrates an example of the IVR unit 28's prompts and responses in steps 48 through 54 of FIG. 4. If a caller is experienced with the IVR unit 28's prompts, the IVR unit 28 allows the caller to interrupt prompting by entering the requested digits. In addition, the IVR unit 28 provides context specific help to an inexperienced caller at specific points in the dialog by entering a help key such as "*".

TABLE 1

IVR Prompts and Responses

| EVENT | PROMPT | COMMENT |
|---|---|---|
| Ring | "Welcome-You may enter star to obtain assistance." | Callers may obtain information or assistance from an IVR unit or a customer service representative. |
|  | "Please enter the number where you want to be called [area code first], followed by the pound sign or enter pound to skip this option." | If call back number used for caller identification, area code is required in areas with area code uncertainty. |
| # entry | "We will tell your party your identification if you enter your home number or main business number [area code first] followed by the pound sign or press pound to skip this option." | If home or main business number is used for caller identification, area code is required in areas with area code uncertainty. |
| # entry | "Thank You" | |

The paging terminal 12 transmits the call back number and the caller's base number, if received, to the CIS 26 for the purpose of determining caller identification information. The paging terminal 12 allows an input of up to eighteen digits (0 through 9 and * which is interpreted as a dash). The eighteen digits allow for ten digits of telephone number, three dashes, and up to 5-digit codes or extension numbers following the telephone number. For example, the paging terminal 12 allows "XXX*XXX*XXXX*EEEEE" as an input.

After receiving the input from the caller, the paging terminal 12 transmits a request message to the CIS 26 in the following format:

[Src, BaseDigits, CbkDigits]

where Src identifies the requesting paging terminal 12, BaseDigits is the digit string (0–9,*) for the caller's base number, and CbkDigits is the digit string (0–9,*) for the call back number. The request message from the paging terminal 12 will also include information required to issue a page such as a capcode. The BaseDigits and CbkDigits are null if no digits are available.

Once the CIS 26 receives the request message from the paging terminal 12, the CIS 26 processes the BaseDigits and CbkDigits for caller identification purposes. The CIS 26 requires ten digits, a 7-digit telephone number with an area code, for caller identification. In areas with area code uncertainty (e.g. areas served by several area codes), the caller must input an area code. In areas with area code certainty (e.g. areas served by one area code), the CIS 26 prefixes a default area code to a 7-digit input. If the input telephone number plus any default area code prefix exceeds ten digits, the leftmost ten digits are treated as the telephone number. If less than ten digits are available, i.e. no area code was inputted and the area served is uncertain, then the CIS 26 indicates that caller identification information is unavailable. Even though the call back number may be processed for caller identification purposes, i.e. by adding a prefix or ignoring an extension, the CIS 26 always assembles the paging message with the original unprocessed call back number.

The following pseudo code below summarizes the number processing procedure performed by the CIS 26. Table 2 defines the function calls and variables in the pseudo code.

Procedure NumberProcessing(Digits) Returns Number
    Number=Strip(Digits,*)
    If Not AreaCodeUnc(Src)
    Then
      If Len(Number)=7
        Then
            Number=DefaultAC(Src) & Number
      EndIf
    EndIf
    Length=Len(Number)
      If Length≧10
      Then
        Number=Left(Number, 10)
      Else
        Number-null
    EndIf
End Procedure

TABLE 2

Definitions of Variables/Functions for Number Processing Procedure

| FUNCTION/VARIABLE | DEFINITION |
|---|---|
| Digits | String of digits (0–9,*) representing either BaseDigit or CbkNumber; Maximum length is 18 digits |
| Len(Digits) | Returns a length of digit string |
| Strip(Digits,d) | Returns a digit string with digit d deleted |
| Src | Identifies a requesting paging terminal |
| ACUnc(Src) | Returns true if the requesting message switch has area code uncertainty |
| DefaultAC(Src) | Default area code for the requesting message switch |
| Left(Digits,n) | Returns a string consisting of the leftmost n digits of Digits |

Figure 4:
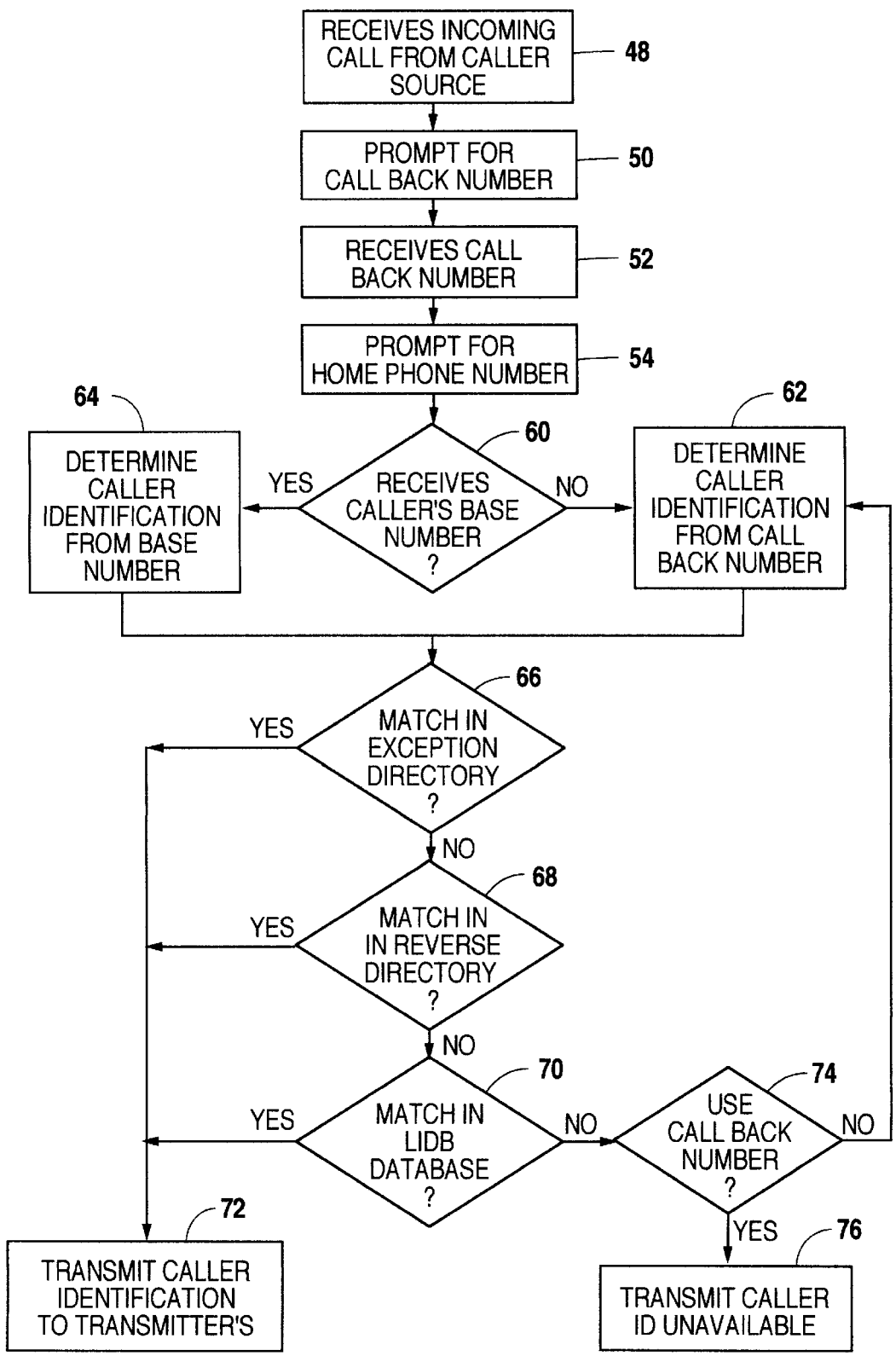
FIG. 4 illustrates a flow chart of the steps performed in the paging system of the present invention.

To determine caller identification, the CIS 26 first determines whether a caller's base number was received in step 60 of FIG. 4. If so, the CIS uses this base number to determine caller identification, as shown in step 64. However, if the CIS 26 only receives the call back number, the CIS 26 may use this call back number to determine the caller identification as shown in step 62.

Using the selected number, either the base number or the call back number, the CIS 26 may use any one or combination of three methods to determine the caller identification. First, the CIS 26 searches an exception directory 44 for the number. The exception directory 44 is preprogrammed by the subscriber and includes a unique listing for subscribers of predetermined caller identifications associated with telephone numbers. For example, if a telephone number is unlisted or recently changed, a subscriber may request that the paging system 10 program the exception directory 44 to indicate the correct, corresponding caller identification for that telephone number.

If the CIS 26 finds a matching number in the exception directory 44, the CIS 26 assembles a paging message with the caller identification information and the call back number. The CIS 26 transmits this paging message to the transmitters 14, as shown in step 72. In the paging message, the CIS 26 system always transmits the call back number as entered by the caller such that the caller may enter codes which are understood by the subscriber rather than telephone numbers. The caller identification information in the paging message may include the caller's name, address, business or residence, or other information depending on the availability of the information in the exception directory and the preference of the subscriber. The transmitters 14 transmit the paging message to the correct pager 18.

If no match is found in the exception directory 44, the CIS 26 searches a reverse directory 42 for a corresponding listing to the telephone number, as shown in step 68. The reverse directory 42 is a database with a comprehensive listing of telephone numbers with identifications of the corresponding persons or businesses. The reverse directory 42 may include any commercially available reverse directory such as Select-Phone™ sold by ProCD, Inc. If a match is found in the reverse directory 42, the CIS 26 transmits the page with the caller identification information to the transmitters 14, as shown in step 72. Again, the caller identification transmitted to the pager may include the caller's name, address, business or residence, or other available information in the reverse directory depending on the preference of the subscriber. The transmitters 14 transmit the page to the correct pager 18.

If no match is found in the reverse directory 42, the LIDB interface 46 in the CIS 26 then initiates an access of a LIDB database in the LEC 22, as shown in step 70. As explained previously, the LIDB interface 46 either directly provides SS7-compliant connectivity at the CIS 26 and TCAP-compliant software to implement the LIDB access (CNAM request) or interfaces with a third party SS7/LIDB access provider. The LIDB interface 46 transmits the request for caller identification in the LIDB database. The LIDB database includes current information on telephone numbers and corresponding listings for the LEC 22. The LIDB database may provide caller identification for individual PBX listings and identify the origin of otherwise unavailable telephone numbers as a pay phone or mobile phone. A reverse directory typically fails to include lines from a business using a key system or PBX. A reverse directory may also be unable to identify the source of unlisted numbers as mobile phones or pay phones. In addition, a reverse directory is less reliable and will accumulate errors as people add and drop service during a year if not updated. Thus, the LIDB database is probably the most current and comprehensive identification method. If a match is found in the LIDB database, the LEC 22 transmits the corresponding listing to the LIDB interface 46 in the CIS 26. The CIS 26 assembles a paging message with the caller identification information and transmits the paging message to the transmitters 14, as shown in step 72. Currently, only the caller name is available from the LIDB database. However, other information, such as address or business/residence, may be provided when available from the database. The transmitters 14 transmit the paging message to the correct pager 18.

If no match is found in the LIDB database, the CIS 26 determines whether the call back number was used to determine caller identification (i.e. rather than the caller's base number), as shown in step 74. If not, the CIS 26 then returns to step 62 and repeats the above three methods of determining caller identification using the call back number. If the call back number was used in the previous determination, then either the caller's base number was not available or was already used in the determination and no corresponding caller identification was found. Since neither the call back number or caller's base number was able to generate caller identification information, the CIS 26 assembles a paging message to the transmitters 14 which indicates that the caller identification is unavailable, as shown in step 76.

An example, the pager display format for the embodiment of FIG. 4 is shown below.

From[caller identification][?][call back number]

If a caller identification is available, it is displayed following "From." If the caller identification was derived from the call back number, a "?" is displayed after the caller identification to indicate that the caller identification may be inaccurate. The call back number is displayed as entered by the caller. The following table summarizes the paging message generated by the CIS 26 in response to whether caller identification was determined.

| BaseDigits | Name | CbkDigits | Name | Paging Message |
|---|---|---|---|---|
| N | N | N | N | Null |
| Y | N | N | N | Null |
| Y | Y | N | N | From[CallerIdentification] |
| N | N | Y | N | [Call Back Number] |
| Y | N | Y | N | [Call Back Number] |
| Y | Y | Y | Y | From[Caller Identification] [Call Back Number] |
| N | N | Y | Y | From[Caller Identification from Call Back Name?] [Call Back Number] |
| Y | N | Y | Y | [Call Back Number] |

In order to control the length of the paging message transmitted to the pager 18, the paging system 10 may implement an intelligent truncation process of the caller identification, or limit caller identification to only a first initial and last name with no address listing or other information.

A person of skill in the art will appreciate that any one or any combination of the three above methods, i.e. an exception directory, a reverse directory, or access of a LIDB database, may be used by the CIS 26 to determine caller identification depending on the cost and design of the system. For example, the CIS 26 may only include an exception directory 44 and reverse directory 42 without a LIDB interface 46, e.g., when a reverse directory 42 and exception database 44 are less expensive to implement and operate than an SS7 network to access a LIDB database in LEC 22. Alternatively, the CIS 26 may only include the LIDB interface 46 without an exception database 44 or reverse directory 42 since the LIDB database is probably the most current and comprehensive source of caller identification. Other such combinations or alternatives may also be implemented in the CIS 26 to determine caller identification.

The CIS 26, no matter which of the three methods is used, preferably first tests the caller's base number, if any, to determine caller identification prior to using the call back number. The most useful number in the determination of caller identification is the caller's base number; i.e., a number associated with the caller's identity such as the home phone number/main business number. After the caller's base number, the call back number is the second most useful number in the determination of caller identification. For example, if the caller wishes to have the subscriber return the call to the home telephone, obviously there will be no difference in the caller's base number and call back number. The caller may then only input the call back number and receive the proper identification. However, if the call back number is to a pay phone, a mobile phone, or a business, the corresponding listing to the call back number will not be an accurate description of the caller or the listing may not be available. Thus, the caller's base number provides a better indication of caller identification than the call back number. The option to enter a caller's base number allows the caller to input any number that will be associated with the caller's identity. For example, if the caller is calling on behalf of a business partner, the caller may input the business' or partner's number to identify the call.

The present invention thus has the advantage that it allows the input of a caller's base number such as a home/main business number along with a call back number and uses the caller's base number as the first source for determining caller identification. As a result, the paging system 10 provides caller identification information on a pager that is easily generated by the caller from any location.

In another embodiment of the invention, the CIS 26 may also include a LIDB database or cache. Since the same telephone numbers, especially home telephone numbers, are likely to reoccur for a subscriber, the CIS 26 may cache or save a telephone number and corresponding listing found by accessing LIDB for a predetermined amount of time or permanently store the telephone number and corresponding listing in a separate database or add the pair to the reverse directory. This caching or storing of pairs will decrease the time and cost of accessing the LIDB database by the CIS 26.

Alternatively, the CIS 26 may access another external database of telephone numbers and corresponding listings maintained by a third party provider other than a LIDB database in a PSTN. For example, R. R. Donnelley provides a current database of telephone numbers and corresponding listings.

Figure 5:
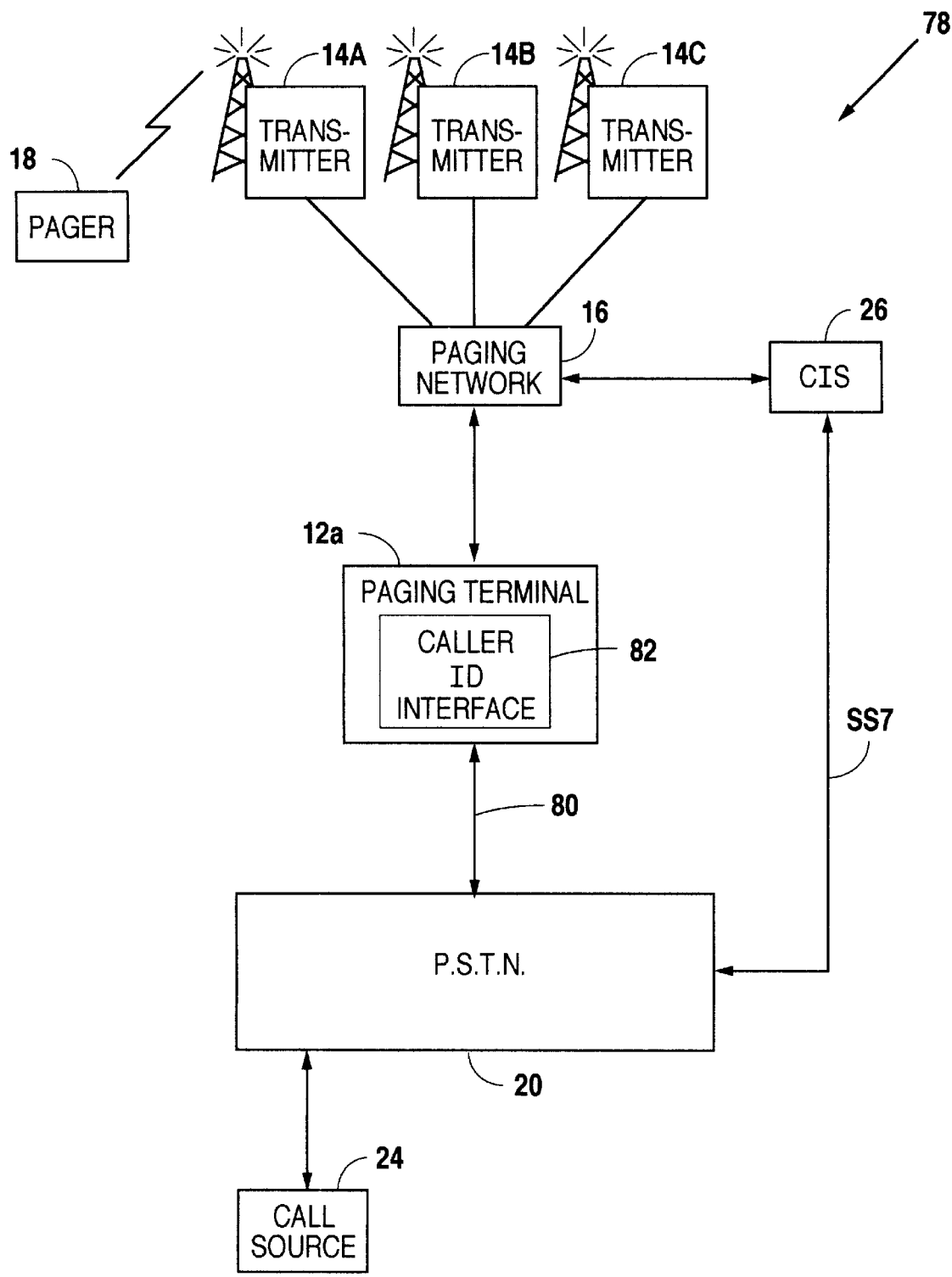
FIG. 5 illustrates a second embodiment of the paging system of the present invention.

A second embodiment of the invention is shown in FIG. 5. In this embodiment, a paging system 78 provides the identity of the call source 24 from the call back number or using Calling Line Identification service (CallerID) or automatic number identification (ANI). CallerID and ANI are not currently available on DID lines which are used for paging systems. In FIG. 5, the lines 80 from the LEC 22 to the paging terminals 12 are either ISDN, such as primary rate ISDN Smart Trunk™ currently available from Southwestern Bell Company, SS7, or another type of line which may transmit CallerID or ANI information from the LEC to the paging terminals. If direct inward dial (DID) is not available on such lines 80, a personal identification number (PIN) number or extension must be entered to identify the subscriber to the paging terminal 12.

The paging terminal 12 additionally includes a CallerID interface 82 which can detect the CallerID or ANI information on lines 80. The CallerID information provides a telephone number for the call source 24, and often call source identification information. For example, Caller ID provides the corresponding listing for the telephone number for the call source 24, the business names for individual PBX listings, and indications of mobile phones and pay phones as a call source. ANI information merely provides the call source telephone number without corresponding call source identification information.

Figure 6:
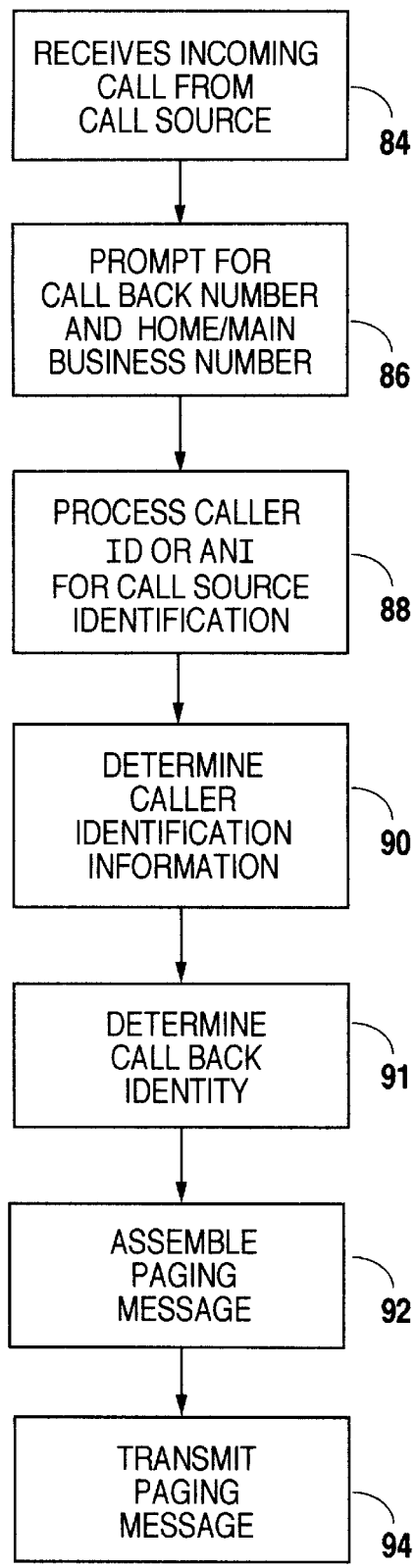
FIG. 6 illustrates a flow chart depicting the steps performed by the second embodiment of the paging system of the present invention.

The operation of the paging system 78 is now discussed with reference to FIG. 6. In step 84, a paging terminal 12 in the paging system 78 receives an incoming call from the call source 24. In step 86, the paging terminal 12 prompts the caller for a call back number and home phone/main business number as a caller's base number similarly to paging system 10 in FIG. 1.

In step 88, the CallerID interface 82 receives the CallerID or ANI information for the call source 24. If CallerID information is available, the CallerID interface 82 generates a call source identification for the paging message. If only ANI information is available, the paging terminal 12 forwards the ANI information to the CIS 26 along with the call back number and the caller's base number for identification. The CIS 26 will determine the call source identification for the ANI information using the methods described above: an exception list, a reverse directory, and/or access to a LIDB database.

Similarly, the CIS 26 determines caller identification information from the caller's base number in step 90. However, in this embodiment, even if the caller's base number is available, the CIS 26 determines an identification corresponding to the call back number as well. This call back identity is provided to the pager 18 to identify the place to return the call. For example, if a caller enters a call back number incorrectly, the subscriber may be able to determine the correct call back number from the call back identity, as shown in step 91.

The CIS thus provides information on the call source, the caller identification, and the call back identity. The CIS 26 assembles a paging message in step 92 which includes the call source identification, if any, the caller identification information, the call back identity and the call back number. The transmitters 14 then transmit the paging message to the subscriber's pager 18, as shown in step 94.

Alternatively, if the CallerID information is available to the CallerID interface 82 in the paging terminal 12, the paging terminal may only transmit the call back number and caller's base number to the CIS 26. The CIS 26 determines caller identification information and/or call back identity which it transmits back to the paging terminal 12 for assemblage into a paging message. The paging terminal 12 then transmits the assembled paging message to the transmitters 14.

Figure 7:
FIG. 7 illustrates an example pager display of the present invention.

An example display of a pager 18 is shown in FIG. 7. Generally, "from" precedes the caller identification information derived from the caller's base number, if present; "@" precedes the call source identification derived from the CallerID or ANI information, if present; "Call" precedes the call back identity derived from the call back number; and the call back number is displayed last. The order on the display is shown below.

From [Caller Identification]@[call source identification]Call[Call back identity][call back number].

The paging system 78 suppresses duplicate names in the paging message. For example, if the caller identification and the call back identity are the same, only one is displayed. The paging system 78 also suppresses names or information if corresponding numbers were not entered by the caller. For example, if the caller failed to enter a base number, the paging system 78 suppresses the "from" and caller identification information.

By using CallerID or ANI information, the paging system 78 provides further information to the subscriber regarding the call source. The paging system designates the information derived from CallerID or ANI information as call source information rather than as caller identification information because the CallerID or ANI information will not accurately reflect the caller's identification when the caller is not calling from their home or main business. For example, if the caller is at a pay phone, a mobile phone, a third party's residence, then the CallerID or ANI information will be unable to identify the caller or inaccurately identify the caller. The paging system thus preferably uses a caller's base number such as a home/main business number to determine caller identification information and then uses CallerID or ANI information to determine call source information to the subscriber.

Another embodiment of the present invention is shown in FIG. 8. In FIG. 8, a paging system 96 uses voice recognition unit 98 in paging terminal 12 to gather caller identification information and/or a message from the caller. The voice recognition unit 98 preferably includes an interactive voice response unit to prompt and gather information from the caller.

The paging terminal 12 receives an incoming call from call source 24 and responds with a greeting or audible beeps for the caller to enter a call back number. The voice recognition unit 98 prompts the caller to spell or speak their name. The voice recognition unit analyzes the voice to generate a name and then searches a database of names to check if the generated name is a valid name. If it is a valid name, the voice recognition unit prompts the caller to verify the name. If the name is not correct, the voice recognition unit 98 requests the caller to respell or repeat the name. The voice recognition unit 98 may also prompt the caller to spell or speak a short message.

The paging terminal 12 assembles a paging message which includes the call back number, the caller's name and message, if any, to the transmitters 14. The transmitters 14 transmit the paging message to the subscriber's pager 18.

Alternatively, paging system 96 may include CIS 26 (not shown) to determine call back identity from the call back number. In addition, if the voice recognition unit is unable to determine the caller identification from the caller's verbal input, the paging system may prompt the caller to enter a home phone number/main business number to use as a caller's base number. The CIS 26 may then determine the caller identification from the caller's base number.

The alpha enhanced paging system 96 thus provides the subscriber with additional information regarding the caller, the call source, and the call back number. The subscriber does not have to pre-program a database stored in the pager 18 or paging terminal 12 prior to the identification.

Alpha Enhanced Paging and Voice Mail System

Figure 9:
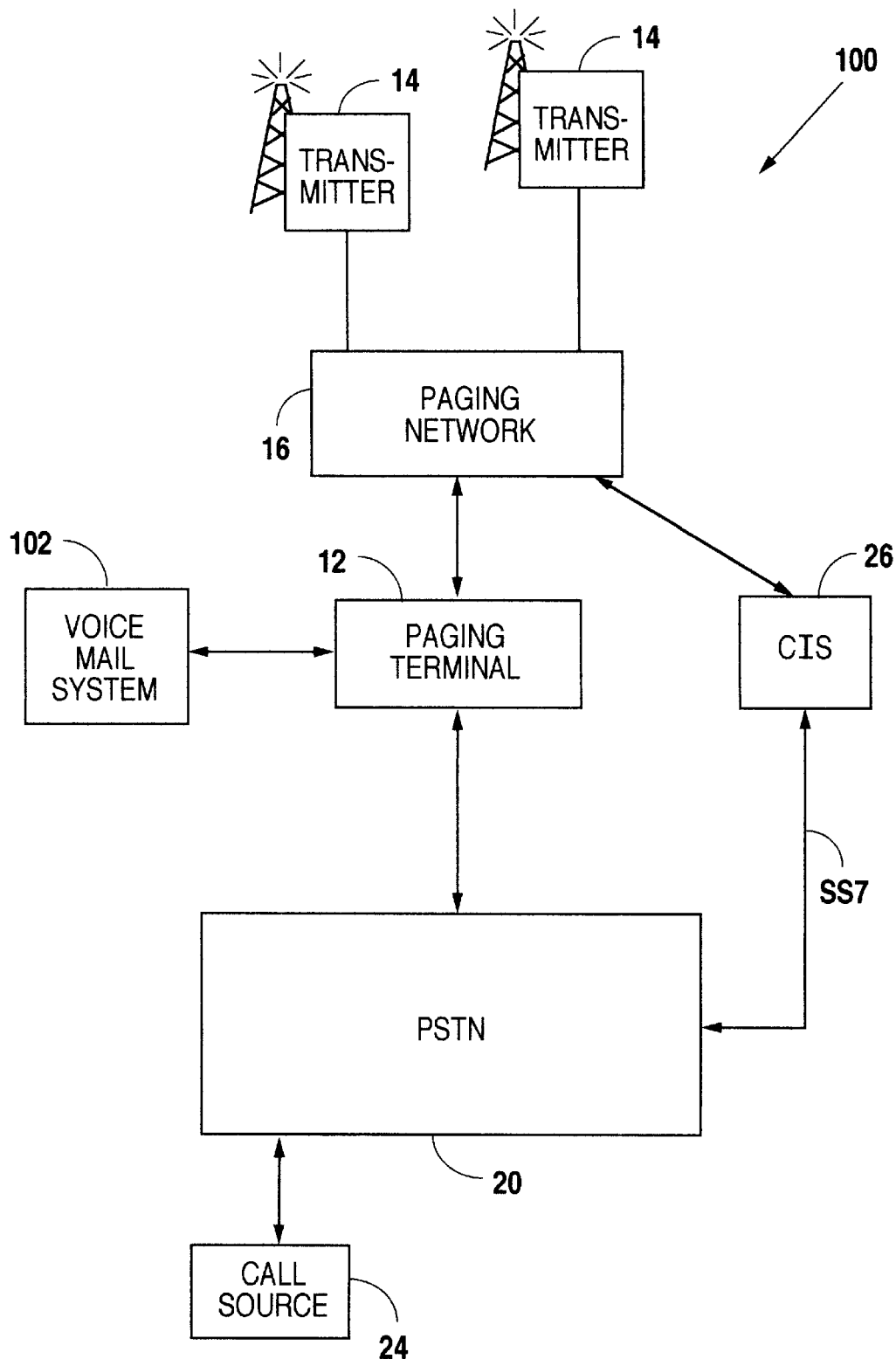
FIG. 9 illustrates an alpha enhanced paging and voice mail system of the present invention.

Another embodiment of the invention incorporates the use of a voice mail system with the above-described alpha-enhanced paging system. FIG. 9 illustrates an alpha enhanced paging and voice mail system 100 which can receive and record messages for later playback. A voice mail system 102 is attached to paging terminal 12. Alternatively, the voice mail system 102 may be incorporated within paging terminal 12, as shown in FIG. 2. Paging terminal 12 includes IVR unit 28, digit collection 30, message assembly 32, subscriber database 34, and administration interface unit 36, similarly to those described in FIG. 2.

Figure 10:
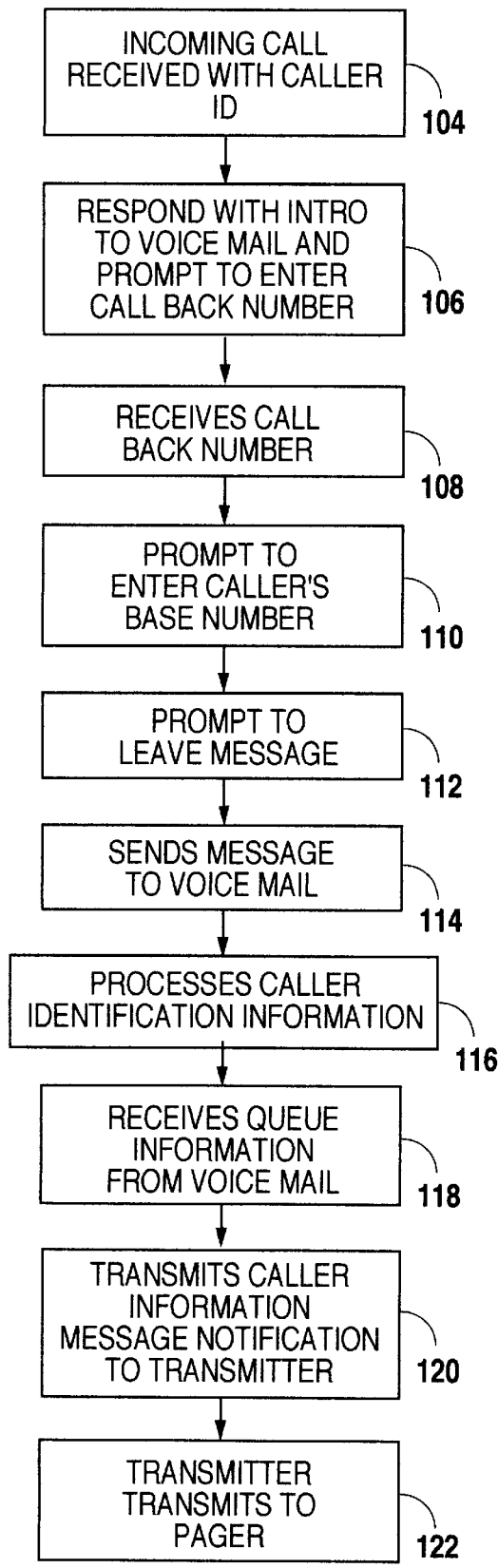
FIG. 10 illustrates a flow chart depicting the steps performed by the alpha enhanced paging and voice mail system of the present invention.

The operation of the alpha-enhanced paging and voice mail system 100 is described with respect to FIG. 10. In step 104, the paging terminal 12 receives an incoming call from the PSTN 20. The IVR unit 28 of the paging terminal 12 responds with an introduction to the voice mail system 102 and a prompt to enter a call back number for paging the subscriber, as shown in step in 106. The caller may enter a call back number or bypass the option. The IVR unit 28 then requests the caller to enter a home/main business phone number in step 108. The paging terminal 12 receives the call back number and if entered, the home/main business phone number, as shown in step 110. In step 112, the IVR unit 28 prompts the caller to leave a message. Table 3 below illustrates an example of the IVR unit 28's prompts and responses in steps 106 through 112 of FIG. 10. If a caller is experienced with the IVR unit 28's prompts, the IVR unit 28 allows the caller to interrupt prompting by entering the requested digits. In addition, the IVR unit 28 provides context specific help to an inexperienced caller at specific points in the dialog by entering a help key such as "*".

TABLE 3

IVR Prompts and Responses

| EVENT | PROMPT | COMMENT |
| --- | --- | --- |
| Ring | "Welcome-You may enter star to obtain assistance." | Callers may obtain information or assistance from a customer service representative. |
|  | "You have reached the voice mail service for [subscriber]." | The subscriber may record his name to be included in this prompt |
|  | "We will inform your party of a return phone number. Please enter the number where you want to be called [area code first], followed by the pound sign or enter pound to skip this option." |  |
| # entry | "We will tell your party your identification if enter your home number or main business number [area code first] followed by the | Area code is necessary in areas with area code uncertainty. |

TABLE 3-continued

IVR Prompts and Responses

| EVENT | PROMPT | COMMENT |
| --- | --- | --- |
| Digits or # | pound sign or press pound to skip this option." [Subscriber's personal greeting] or "If you want to record a message, begin at the tone." Beep. | Option to limit time of personal greeting. |
| Message | | Option to limit message length. |

In step 114, the paging terminal receives the voice message and transmits the voice message to the voice mail system 98. The voice mail system 98 returns queue information regarding the voice message, such as an assigned number for the voice message, how many voice messages are waiting for the subscriber, or the order of the voice message, as shown in step 116.

As described above, the paging terminal 12 then transmits a request message to the CIS 26 to obtain caller identification information from the caller's base number, i.e., the home phone number/main business number and if not available, the call back number. The paging terminal 12 transmits a request message to the CIS 26 in the following format:

[Src,BaseDigits,CbkDigits,Vmsg,VTag]

where Src identifies the requesting paging terminal 12, BaseDigits is the digit string (0–9,*) for the caller's base number, and CbkDigits is the digit string (0–9,*) for the call back number; Vmsg indicates whether a voice mail message was recorded; and VTag is the voice message queue information. The request message from the paging terminal 12 will also include information required to issue a page such as a capcode. The BaseDigits and CbkDigits are null if no digits are available.

Once the CIS 26 receives the request message from the paging terminal 12, the CIS 26 searches an exception directory and/or reverse directory for corresponding listings to the caller's base number and if no match, the CIS 26 may access a LIDB database to determine caller identification information. In addition, as described above with respect to FIG. 8, the paging terminal 12 may also use a voice recognition unit 98 to gather information from the caller such as the caller's name or a short message. Also, the paging terminal 12 may obtain call source information from CallerID or ANI information, as described with respect to FIG. 5.

The paging terminal 12 then assembles and transmits a paging message which includes a message notification, queue information regarding the message, caller identification information, and, if available, caller source identity. If a caller fails to leave a voice message, the paging terminal 12 still transmits a paging message which includes caller identification information, if a call-back or caller's base number was entered, or caller source identity, if available through CallerID or ANI, without a message notification.

Figure 11:
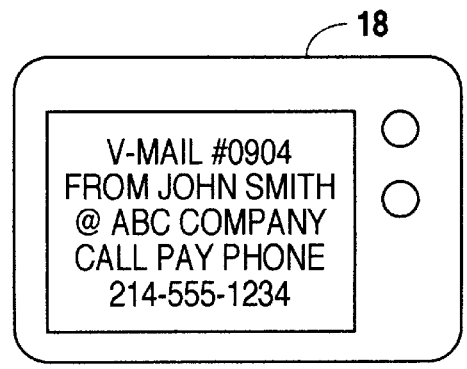
FIG. 11 illustrates an example of a display of a pager in the alpha enhanced paging and voice mail system of the present invention.

An example of a display of pager 18 in the voice mail system 100 is shown in FIG. 11. The display indicates that a voice mail has been received and the queue information (#0904) associated with the voice mail. In addition, the display indicates caller identification and call source identity, if available.

Using the queue information associated with a message, a subscriber may directly access the corresponding voice message in the voice mail system 102. For example, if the queue information assigns the message a number "0904", the subscriber may input the number "0904" and bypass previous messages to directly access message number "0904".

The integration of a voice mail system with alpha-enhanced paging system allows a subscriber to know who left a voice mail and where to return a call without having to access the voice mail system. By providing insight to the caller, the subscriber is better able to manage the response to a voice mail. In addition, the subscriber may directly access the voice message needed with the queue information provided on the pager display.

Figure 12:
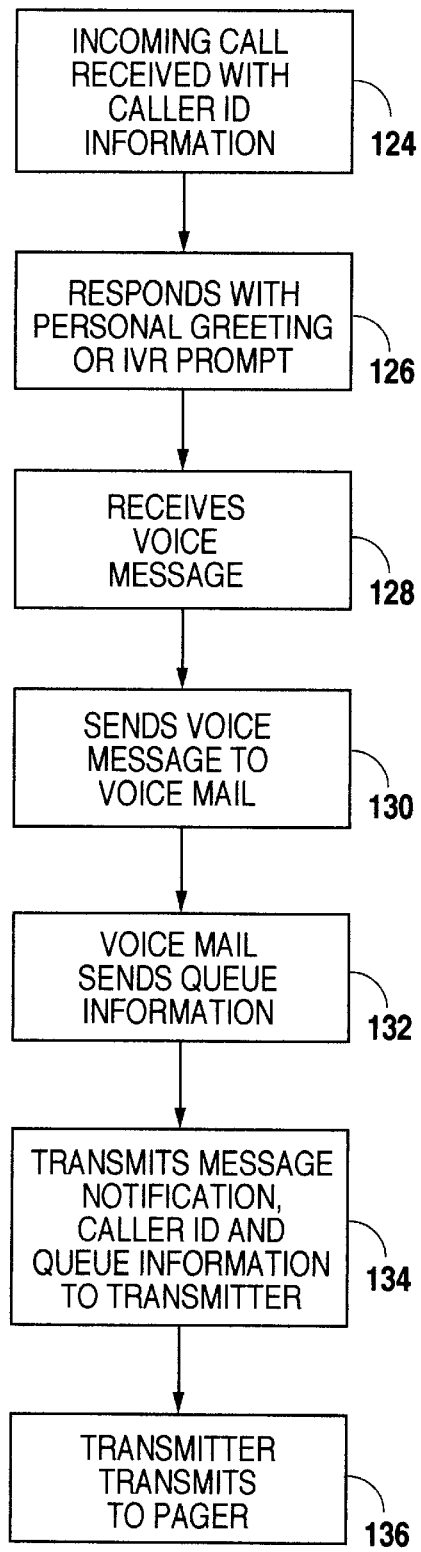
FIG. 12 illustrates a flow chart depicting the steps performed by an alternate embodiment of the alpha enhanced paging and voice mail system of the present invention.

Alternatively, the subscriber to the alpha enhanced paging and voice mail system 100 may want the ability to receive some indication of caller identity without caller involvement or knowledge. The subscriber may then screen calls without a caller knowing the subscriber was notified of the voice mail or caller identity. FIG. 12 illustrates a second embodiment wherein the paging terminal 12 receives CallerIDs or ANI information with an incoming call, as shown in step 124. The paging terminal 12 only prompts the caller to leave a message, as shown in step 126. The paging terminal 12 receives a voice message from the caller as shown in step 128 and forwards the message to the voice mail system 102 in step 130. The voice mail system returns queue information about the message as shown in step 132. The paging terminal 12 assembles a paging message which includes a message notification, queue information and the CallerID, or ANI, information, as shown in step 136. ANI information or CallerID information on the incoming call is thus forwarded to the subscriber along with a notification of the voice mail. Though CallerID or ANI information is not always indicative of the caller's identity, it may still be useful to the subscriber in managing responses to voice mails. By using CallerID or ANI information, the caller is unaware of the voice mail notification or the provision of call source information to the subscriber's pager 18.

Caller Identification in a Wireless Telephony System

Figure 13:
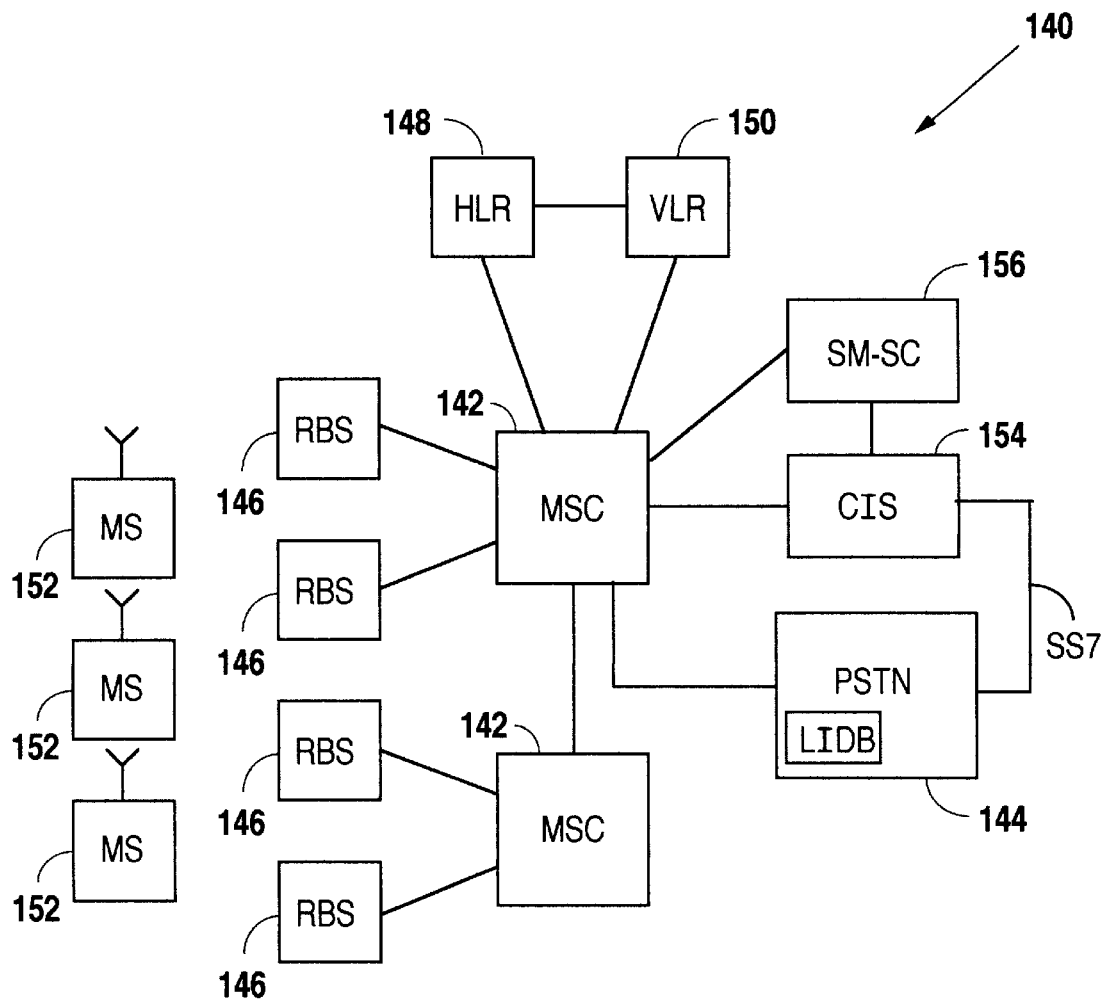
FIG. 13 illustrates a wireless telephony system in which the present invention may be implemented.

The present invention may also be implemented in other wireless communications systems besides a paging network, such as a cellular telephony network or personal communication services (PCS) network, to provide caller identification. FIG. 13 illustrates a wireless telephony network 140. The wireless telephony network 140 includes one or more mobile switching centers (MSC) 142 also known as mobile telephone switching offices. The MSCs 142 are connected a public switched telephone network (PSTN) 144, a home location register 148, and a visitor location register 150. In addition, a short messaging service center (SM-SC) 156 and caller identification server (CIS) 154 are connected to the MSC 12. The CIS 154 is also connected to the PST 144 through an SS7 network.

Each MSC 142 is also connected to one or more radio base stations 146. A plurality of mobile stations (MS) 152 are located in a geographical service area covered by the wireless telephony system 140. The radio base stations 146 are positioned within the geographic area covered by the wireless telephony system 140 and act as an interface between the mobile stations 152 and the mobile service centers 142. The MSCs 142 control the operation of the connected radio base stations 146 within the wireless telephony system 2, such as setting up calls and coordinating the activities of the radio base stations 146. In addition, the MSCs 142 act as switches to direct calls from the PSTN to and from the proper radio base station 146.

The MSCs 142 in many cellular telephony systems and PCS systems today provide a paging service to the mobile stations 152 using short messaging services (SMS). The short messaging services sends messages which may be displayed by the mobile stations 152 that are similar to an alpha page. Thus the alpha-enhanced numeric pages of the present invention could be included as part of the short messaging services. For example, a caller may call a mobile station 152 and, after a number of rings, the call would be transferred to the caller identification server (CIS) 154 that would perform the caller identification functions as previously described. For example, CIS 154 requests and receives the call back number and base number of the caller. The CIS 154 collects caller identification information from the base number of the caller, or from the call back number if the base number is not available, using the methods previously described. The CIS 154 then transmits a message containing the information to the short message service center (SM-SC) 156 which sends a message to MSC 142. The MSC 142 transmits the message to the proper mobile station 152 using short messaging services. The mobile stations 152 thus receive the message with the caller identification information and may display the information in the format previously described.

It is believed that the operation and construction of the present invention will be apparent from the foregoing description and, while the invention shown and described herein has been characterized as particular embodiments, changes and modifications may be made therein without departing from the spirit and scope of the invention as defined in the following claims.

What is claimed is:

1. A method of communicating caller identification to a mobile unit in a wireless communications system, comprising the steps of:
    receiving an incoming call from a caller;
    prompting the caller to input a call back number;
    prompting the caller to orally communicate a caller identity;
    analyzing the oral communication of caller identity to generate the caller identity in a digital electronic format;
    searching a database of names to verify that the generated caller identity is accurate;
    in response to determining that the generated caller identity is not accurate, prompting the caller to input a base telephone number associated with the identity of the caller;
    in response to receiving the base telephone number, determining caller identification from the base telephone number; and
    transmitting a paging message including the caller identification and call back number to the mobile unit.

2. The method of claim 1 wherein the step of determining caller identification from the base telephone number comprises the step of:
    accessing a line identification database in an external public switched telephone network to locate a listing corresponding to the base telephone number.

3. The method of claim 2 wherein the step of determining caller identification from the base telephone number further includes the steps of:
    searching an exception directory for a corresponding listing to the base telephone number;
    in response to not locating a corresponding listing to the base telephone number in the exception directory, searching a reverse directory for a corresponding listing to the base telephone number; and
    wherein the step of accessing a line information database in an external public switched telephone network is performed in response to not locating a corresponding listing to the base telephone number in the exception directory.

4. A method of communicating caller identification to a mobile unit in a wireless communications system, comprising the steps of: receiving an incoming call from a caller; prompting the caller to input a call back number and a base telephone number, including prompting the caller to input a telephone number that is associated with the caller's identity; in response to receiving the base telephone number, determining a caller identification from the base telephone number, including accessing a database in an external network that includes telephone numbers and corresponding listings to locate a listing corresponding to the base telephone number, including accessing a line identification database in an external public switched telephone network to locate a listing corresponding to the base telephone number; in response to not determining the caller identification from the base telephone number, determining the caller identification from the call back number; and transmitting a paging message including the caller identification and the call back number to the mobile unit.

5. The method of claim 4 wherein the step of determining the caller identification from the base telephone number further includes the steps of: searching an exception directory for a corresponding listing to the base telephone number; in response to not locating a corresponding listing to the base telephone number in the exception directory, searching a reverse directory for a corresponding listing to the base telephone number; and wherein the step of accessing a line information database in an external public switched telephone network is performed in response to not locating a corresponding listing to the base telephone number in the exception directory.

6. The method of claim 5 wherein the step of in response to not determining the caller identification from the base telephone number, determining the caller identification from the call back number includes the steps of: searching an exception directory for a corresponding listing to the call back number; in response to not locating a corresponding listing to the call back number in the exception directory, searching a reverse directory for a corresponding listing to the call back number; and in response to not locating a corresponding listing to the base telephone number in the exception directory, accessing a line identification database in an external public switched telephone network for a listing corresponding to the call back number.

7. The method of claim 6 further including the steps of:
    storing a corresponding listing found by accessing the line identification database for a predetermined amount of time to a database directory.

8. The method of claim 4 further including the steps of: receiving caller identification line information from a public switched telephone number over a line connection with the calling party; and wherein the step of transmitting a paging message including the caller identification and call back number to the mobile unit comprises the step of transmitting the caller identification line information with the paging message.

* * * * *